Dec. 24, 1935.    H. TEETOR    2,025,334
PISTON RING EXPANDER
Filed May 25, 1935    2 Sheets-Sheet 1
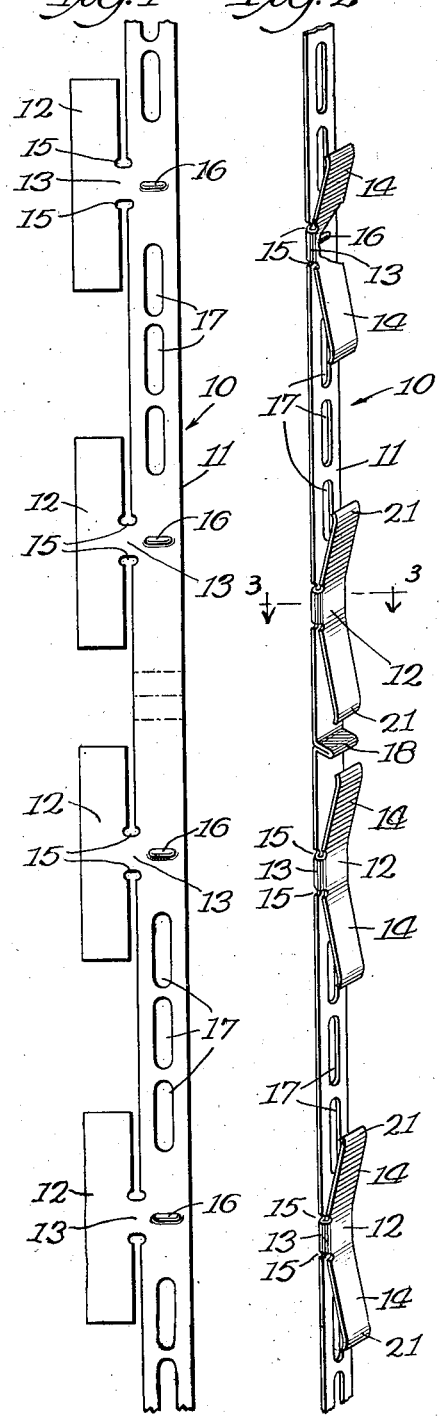
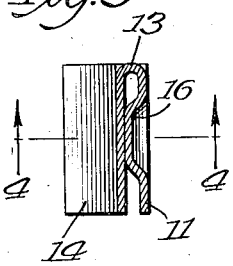
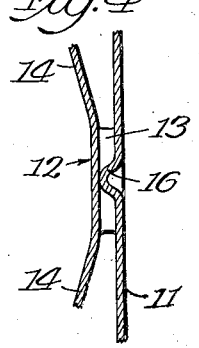
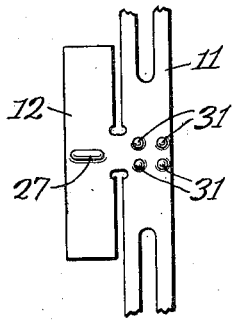
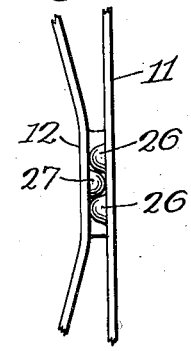
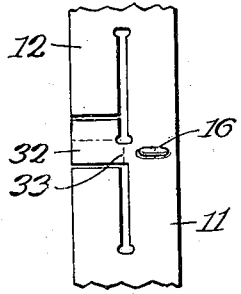
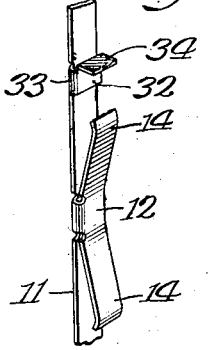
Inventor
Herman Teetor
By Davis, Macauley, May Lindsey & Smith Attys.

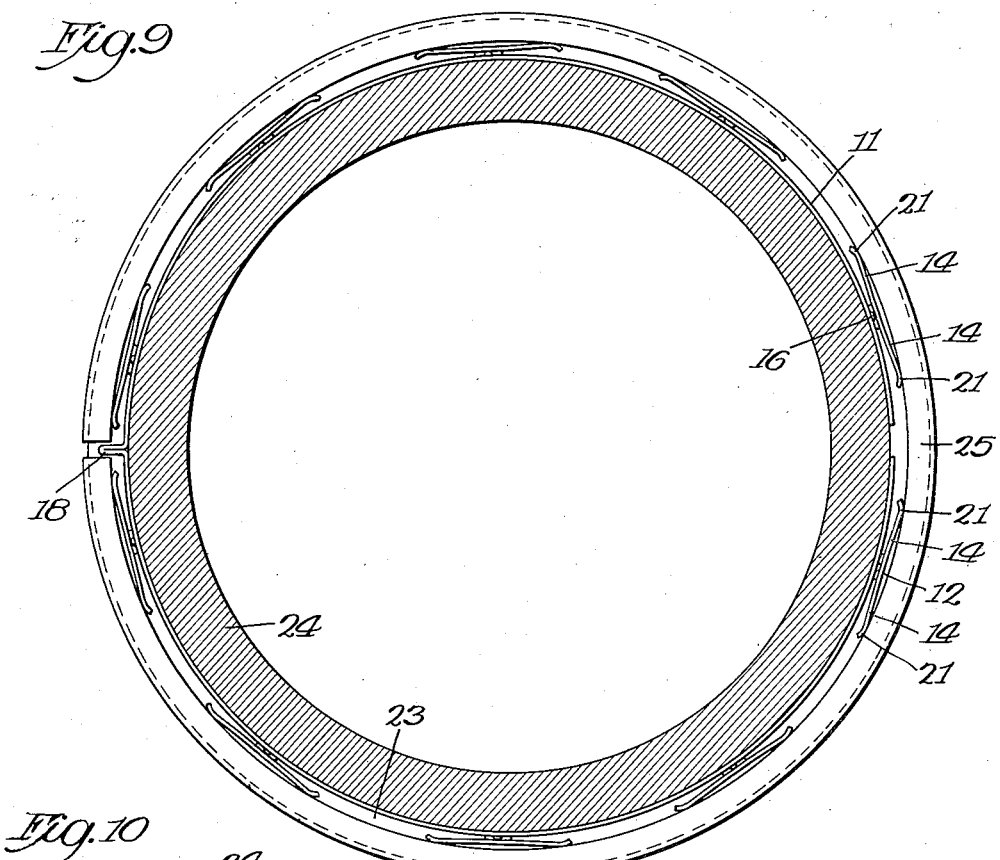
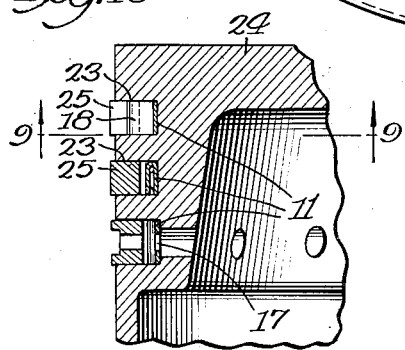
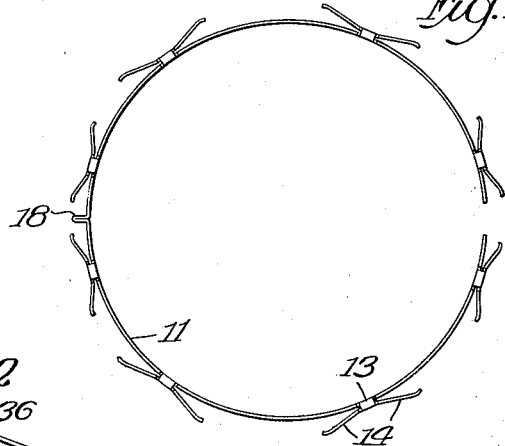
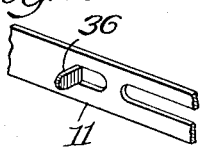
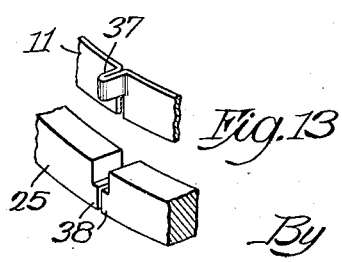

Patented Dec. 24, 1935

2,025,334

UNITED STATES PATENT OFFICE 2,025,334

PISTON RING EXPANDER

Herman Teetor, Hagerstown, Ind., assignor to
The Perfect Circle Company, Hagerstown, Ind.,
a corporation of Indiana

REISSUED

Application May 25, 1935, Serial No. 23,477

10 Claims. (Cl. 309—43)

My invention relates to piston ring expanders for use in connection with and adapted to augment the expanding action of piston rings for internal combustion engines and the like.

One object of my invention is to provide a novel one-piece spring expander formed from a stamping and shaped and bent to provide a plurality of independent, individually operable spring elements that are suitably carried and united by a supporting strip or band.

Another object of my invention is to provide integral means for connecting the spring members to one edge of the supporting band and spacing them therefrom.

Another object of my invention is to provide a ring expander having spring elements for exerting the required pressure against a ring to cause the latter to bear with a substantially correct pressure against the cylinder wall, the positions of the elements being maintained relative to the joint of the ring.

A further object is to provide an expander of the character indicated in which the spring elements on opposite sides of the ring joint are located closer together because of the greater flexibility of the ends of the ring.

These and further objects of my invention will be set forth in the following specification, reference being had to the accompanying drawings, and the novel means by which said objects are effectuated will be definitely pointed out in the claims.

In the drawings:

Figure 1 is a plan view of a portion of the stamping from which the expander is made;

Fig. 2 is a perspective view of a portion of the device after the parts have been bent into position;

Figs. 3 and 4 are sections along the lines 3—3 and 4—4 in Figs. 2 and 3, respectively, looking in the direction of the arrows, and showing the projections against which the spring leaves are adapted to rest;

Fig. 5 is a plan view of a portion of a stamping and shows a modified form of means for spacing the spring members and the band;

Fig. 6 is a bottom edge elevation showing a further modified form of spacing means;

Fig. 7 is a plan view of the central part of a modified form of stamping from which the expander is made and shows means providing a modified form of tongue construction for insertion in the ring joint;

Fig. 8 is a perspective view of the portion shown in Fig. 7 after the tongue construction is bent into the desired shape;

Fig. 9 is a sectional bottom plan view of a piston showing the expander in position behind a piston ring; the section being taken as on the line 9—9 of Fig. 10;

Fig. 10 is a sectional elevation taken through part of a piston and showing expanders behind the rings;

Fig. 11 is a top edge elevation of a somewhat modified form of expander with spring leaves of different lengths and unequally spaced;

Fig. 12 is a perspective view showing a modified form of tongue for insertion in the ring joint; and Fig. 13 is a perspective view of a portion of a piston ring and a modified tongue on the expander.

Referring to Figs. 1 to 4, inclusive, the numeral 10 designates a portion of a stamping from which the expander is made and which is composed of a ribbon of soft steel that may, for example, have a thickness varying from .005 inch to .020 inch. As indicated, the stamping is cut to provide a strip or band 11 having a width approximately equal to the width of the ring groove in which it is used and of a length slightly less than the root diameter of the ring groove. The stamping is further cut to provide a plurality of plate portions 12 that are offset from and spaced along one side of the strip 11.

Each of the plate portions 12 has a width substantially equal to the width of the supporting band 11 and is intermediately connected to the band 11 by a neck 13, so that when the plate portions are shaped and the necks are bent there are provided a plurality of individual and independently operable spring leaves 14 that extend in opposite directions from the necks and in overlying juxtaposed relation to the carrier band, that is to say the leaves are in overlying substantially concentric relation to the band when the band is given its circular shape. In order to improve the spring action of the spring leaves 14 and to avoid the formation of sharp corners, curved undercuts such as 15 (Fig. 1) may be provided at their junction with the necks 13. The leaves 14 are curved or bent as shown in Fig. 2, so as to bring the ring contacting points 21 thereof as close to the end of each spring leaf as possible, but avoiding any likelihood of the sharp end of the leaf biting into the piston ring. The necks 13 are preferably bent on a pronounced radius as indicated in Fig. 3. The band 11 is further pressed outwardly from one side thereof to form a plurality of elongated bosses 16 in line with the necks 13 so that the centers of the plate portions 12 may have support and be spaced from the band 11, as clearly shown in Figs. 3 and 4.

The strip may also be cut to provide a plurality of suitably shaped and spaced apertures 17 through which oil may drain into the crank case of the engine when the expander backs a ventilated oil ring.

As shown in Fig. 2, the portion of the band between the adjacent ends of two of the spring leaves 14 is doubled back on itself to form a projecting tongue 18 and the space between the ends of these particular leaves is less than that between the adjacent ends of the other leaves. The tongue 18 is preferably diametrically opposite the split or break in the expander (Fig. 9).

After the soft steel stamping is bent and shaped to its final expander form, the expander is heat treated and tempered so that the steel becomes hard and resilient. I preferably permanently give the expander its circular form, though it may be of straight form and then bent circular when placed in the ring groove of a piston.

As shown in Figs. 9 and 10, when the expander is positioned in a ring groove 23 of a piston 24, the supporting band 11 seats against the vertical wall of the ring groove so that the ring contacting points 21 of the spring leaves 14 may properly bear against the inner surface of the piston ring 25 which is appropriately mounted in the groove. The tongue 18 is inserted in the joint between the abutting end faces of the ring, thereby insuring that the expander cannot subsequently shift or creep with reference to the ring, which would disturb the proper pressure characteristics around the ring and particularly at the ends of the ring. The spacing of the ring contacting surfaces 21 around the piston ring provides for the desired pressure characteristics of the ring against the cylinder wall, the greater flexibility of the ring adjacent the joint being taken care of by bringing the contacting surfaces 21 of the spring leaves adjacent the tongue 18 closer together. Each of the spring leaves 14 slides freely against the ring and therefore operates with minimum friction, as well as independently of the other leaf springs, so that proper contact between a portion of the ring and an adjacent out-of-round portion of the cylinder bore is thereby assured. The spring leaves fulcrum more or less about the points of their connection with the necks (as at A in Fig. 4) and the bosses 16 limit the tendency of the intermediate part of the plate portions 12 to move closer toward the supporting band 11.

In Fig. 6 is illustrated a further type of spacing construction wherein a pair of spaced, elongated bosses 26 are substituted for the single boss 16 and in the intermediate part of each plate portion 12 is formed a similar boss 27 that is located within the depression between the bosses 26. This arrangement will not only provide the required support for the spring leaves, but also assure that in the event any one of the curved necks 13 fails, the particular pair of spring leaves 14 will not shift their position lengthwise of the supporting band 11.

The modification shown in Fig. 5 differs from that shown in Fig. 6 only in that four circular bosses 31 are substituted for the elongated bosses 26 of Fig. 5.

The part of the modified stamping shown in Fig. 7 has a plate portion 32 connected by a neck 33 to the upper edge of the supporting band 11. The plate portion 32, as shown in Fig. 8, is folded into overlying relation to the supporting band 11 by providing a bend in the neck 33, similar to those formed in the necks 13, and the free portion of the plate portion 32 is bent to provide a tongue 34 that extends away from the supporting band for insertion in the joint of a ring.

In Fig. 11, the spring leaves adjacent the tongue 18 and also those adjacent the ends of the expander are shorter than the remaining spring leaves. The spring leaves on each half are unequally spaced, the spacing on the two halves however being symmetrical. I have found that this arrangement affords excellent pressure characteristics for some piston rings.

In Fig. 12 is illustrated a modified construction for obtaining a tongue for insertion in a ring joint, wherein a tongue 36 is simply formed by suitably punching the supporting band and bending the punched portion outwardly from the band.

As shown in Fig. 13, the tongue 37, formed by bending the band 11 back upon itself, does not extend to the lower edge of the supporting band so that the tongue may extend into the wide upper portion of the joint in the ring and over steps 38 at the ends of the ring.

I claim:

1. A one-piece spring steel piston ring expander comprising a supporting band, leaf portions in overlying substantially concentric relation to the supporting band, necks integral with one edge of said band and one edge of the leaf portions, and means spacing the leaf portions from the supporting band.

2. A one-piece spring steel piston ring expander comprising a supporting band, leaf portions in overlying substantially concentric relation to the supporting band, necks integral with one edge of said band and one edge of the leaf portions, and means integral with the expander spacing the leaf portions from the supporting band.

3. A one-piece spring steel piston ring expander comprising a supporting band, leaf portions in overlying relation to the supporting band, necks integrally connected to one edge of said band and one edge of the leaf portions intermediate the ends of the latter, and projections in line with the necks spacing the central parts of the leaf portions from the supporting band.

4. A one-piece spring steel piston ring expander comprising a supporting band, leaf portions in overlying relation to the supporting band, necks integrally connected to one edge of said band and one edge of the leaf portions intermediate the ends of the latter, and bosses on the band and in line with the necks spacing the central parts of the leaf portions from the supporting band.

5. A one-piece spring steel piston ring expander comprising a supporting band, leaf portions in overlying relation to the supporting band, necks curved on a radius and integral with the band and the leaf portions, and projections in line with the necks spacing parts of the leaf portions from the supporting band.

6. A one-piece spring steel piston ring expander adapted to be placed in a piston groove behind a piston ring and comprising a supporting band, a plurality of circumferentially spaced spring leaves in overlying substantially concentric relation to the supporting band, and portions projecting from the band and integrally connecting the band and said spring leaves, the leaves projecting longitudinally of the band away from said portions with their free ends adapted to engage against the inner periphery of the piston ring.

7. A one-piece spring steel piston ring expander adapted to be placed in a piston groove behind a piston ring and comprising a supporting band, a plurality of circumferentially spaced spring portions in overlying substantially concentric relation to the supporting band, and necks integrally connecting one edge of the band and one edge of the leaf portions intermediate the ends of the latter, the leaf portions forming spring leaves projecting longitudinally of the band away from the necks and adapted to have their free ends bear against the inner periphery of the piston ring.

8. A one-piece spring steel piston ring expander adapted to be placed in a piston groove behind a piston ring and comprising a supporting band, a plurality of circumferentially spaced spring leaves in overlying substantially concentric relation to the supporting band, and portions projecting from the band and integrally connecting the band and said spring leaves, the leaves projecting longitudinally of the band away from said portions with their free ends adapted to engage against the inner periphery of the piston ring, and a projection on the band and adapted to position the expander with respect to the piston ring.

9. A one-piece spring steel piston ring expander adapted to be placed in a piston groove behind a piston ring and comprising a supporting band, a plurality of circumferentially spaced spring portions in overlying substantially concentric relation to the supporting band, and necks curved on a radius and integrally connecting one edge of the band and one edge of the leaf portions intermediate the ends of the latter, the leaf portions forming spring leaves projecting longitudinally of the band away from the necks and adapted to have their free ends bear against the inner periphery of the piston ring.

10. A one-piece spring steel piston ring expander adapted to be placed in a piston groove behind a piston ring and comprising a supporting band, a plurality of circumferentially spaced spring portions in overlying substantially concentric relation to the supporting band, the expander being provided with recesses that define in part necks integrally connecting one edge of the band and one edge of the leaf portion intermediate the ends of the latter, the leaf portions forming spring leaves projecting longitudinally of the band away from the necks and adapted to have their free ends bear against the inner periphery of the piston ring.

HERMAN TEETOR.